(12) United States Patent
Ueki et al.

(10) Patent No.: US 6,524,511 B1
(45) Date of Patent: Feb. 25, 2003

(54) METHOD FOR FABRICATING AUTOMOTIVE INTERIOR COMPONENTS

(75) Inventors: Katsuji Ueki, Kanagawa-ken (JP); Masamitsu Matsuki, Kanagawa-ken (JP); Sadao Morishita, Kanagawa-ken (JP)

(73) Assignee: Kasai Kogyo Co., Ltd., Tokyo (JP)

( * ) Notice: Subject to any disclaimer, the term of this patent is extended or adjusted under 35 U.S.C. 154(b) by 0 days.

(21) Appl. No.: 08/421,286

(22) Filed: Apr. 13, 1995

Related U.S. Application Data

(63) Continuation of application No. 07/759,360, filed on Sep. 13, 1991, now abandoned.

(30) Foreign Application Priority Data

Feb. 6, 1991 (JP) ................................. 3-015533

(51) Int. Cl.⁷ ..................... B29C 45/14; B29C 51/14; B29C 33/02
(52) U.S. Cl. ................. 264/250; 264/255; 264/259; 264/275
(58) Field of Search ......................... 264/259, 266, 264/316, 511, 274, 275, 328.7, 328.8, 294, 271.1, 250, 255

(56) References Cited

U.S. PATENT DOCUMENTS

| | | | | |
|---|---|---|---|---|
| 3,549,477 A | * | 12/1970 | Burgman | 264/275 |
| 4,639,341 A | * | 1/1987 | Hanamoto et al. | 264/511 |
| 4,740,417 A | * | 4/1988 | Tornero | 264/511 |
| 4,873,041 A | * | 10/1989 | Masui | 264/266 |
| 5,091,031 A | * | 2/1992 | Strapazzini | 264/511 |
| 5,238,640 A | * | 8/1993 | Masui et al. | 264/266 |
| 5,292,465 A | * | 3/1994 | Kobayashi et al. | 264/266 |
| 5,395,580 A | * | 3/1995 | Morita et al. | 264/266 |

FOREIGN PATENT DOCUMENTS

| | | | | |
|---|---|---|---|---|
| DE | 2841826 | * | 6/1979 | 264/266 |
| JP | 565747 | * | 1/1981 | 264/266 |

\* cited by examiner

*Primary Examiner*—Angela Ortiz
(74) *Attorney, Agent, or Firm*—Dickstein Shapiro Morin & Oshinsky LLP

(57) ABSTRACT

An automotive interior component consisting of a resin core member and a surface skin member is fabricated by giving an approximately final shape to the surface skin member before mold press forming the resin core member with the surface skin member placed in the cavity of the die assembly for the mold press forming. Since the surface skin member is given with an approximately final shape in advance, even the most stretched part of the surface skin member would not break or wrinkle during the step of attaching the surface skin member to the resin core member as the latter is being molded.

6 Claims, 5 Drawing Sheets

METHOD FOR FABRICATING AUTOMOTIVE INTERIOR COMPONENTS

This application is a continuation, of application Ser. No. 07/759,360, filed Sep. 13, 1991, now abandoned.

TECHNICAL FIELD

The present invention relates to a method for fabricating automotive interior components such as automotive door trims, rear corner trims and other components related to the upholstery and other ornamental members used in the passenger compartment of the motor vehicle.

BACKGROUND OF THE INVENTION

A conventional automotive interior component, for instance the automotive door trim 1 illustrated in FIG. 8, typically comprises a resin core member 2 molded into a desired curved shape, and a surface skin member 3 laminated on the outer surface of the resin core member 2. Normally, to the end of simplifying the process of fabrication, the surface skin member 3 is attached to the resin core member 2 at the same time as molding the resin core member 2.

As illustrated in FIG. 9, a mold press die assembly having a lower die 4 and an upper die 5 is opened, and the surface skin member 3 is held between the lower die 4 and the upper die 5 of the mold press die assembly by clamping the periphery of the surface skin member 3 with a clamping device 6. Then, the upper die 5 is lowered until a predetermined clearance or a cavity is defined between the upper and the lower dies 4 and 5, and resin material 8 consisting of polyolefin resin material in semi-molten state is introduced into this cavity from gates provided in the lower die 4. Thereby, the surface skin member 3 is integrally attached to the surface of the resin core member 2 at the same time as the resin material 8 is molded into a resin core member 2 having a desired curved shape as illustrated in FIG. 10.

However, according to such a conventional method for fabricating automotive interior components, in case the upper and lower dies 4 and 5 of the mold press die assembly have complicated die surface contours, since the peripheral part of the surface skin member 3 is engaged by corner edges 4a and 5a of the upper and lower dies 4 and 5, the surface skin member 3 may not be able to conform to the curved surface contour of the dies 4 and 5, causing breakage to highly stretched portions of the surface skin member 3 in extreme cases.

Further, when the semi-molten resin material 8 flows into the cavity defined between the upper and lower dies, the surface skin member 3 causes an added resistance to the flow of the resin material 8, and the clearance between the upper and lower dies 4 and 5 must be increased accordingly. This not only increases the consumption of the material, but also increases the thickness of the resin core member 2 thereby undesirably increasing the weight of the fabricated component. Also, the added resistance to the flow of the resin material requires the use of a sufficiently fluid resin material, and this restricts the choice of the resin material.

BRIEF SUMMARY OF THE INVENTION

In view of such problems of the prior art, a primary object of the present invention is to provide a method for fabricating an automotive interior component integrally combining a resin core member and a surface skin member without involving breakage of the surface skin member even when the shape of the component is highly complicated.

A second object of the present invention is to provide a method for fabricating an automotive interior component integrally combining a resin core member and a surface skin member which can reduce the weight of the fabricated component and save the material cost through improvement of the flow property of the resin material.

These and other objects of the present invention can be accomplished by providing a method for fabricating an automotive interior component comprising a resin core member having a desired shape, and a surface skin member attached to an external surface of the resin core member, comprising the steps of: giving a required shape to the surface skin member by using a die assembly for mold press forming while a peripheral part of the surface skin member is secured by a clamping device; opening a die assembly for mold press forming and placing the surface skin member in a cavity defined in the die assembly; supplying resin material in semi-molten state into the cavity; and engaging the die assembly having the surface skin member placed therein to mold the resin material into the resin core member having a desired shape and integrally attach the surface skin member to the molded resin core member.

Since the surface skin member is formed into an approximately final shape by a preliminary forming process, the surface skin member is not subjected to any excessive tension when the resin core member is mold press formed in its semi-molten state in the subsequent step, and the breakage and wrinkling of the surface skin member can be positively avoided.

Furthermore, since the surface member presents very little resistance to the flow of the resin material, the thickness of the product can be reduced as desired. Also, the reduced flow resistance broadens the choice of the material for the resin core member and the number of the gates in the die assembly can be reduced. The reduction in the number of gates in the die assembly contributes to the reduction in the cost of the die assembly.

Preferably, the surface skin member is softened by heat in the step of giving a required shape to the surface skin member so that the surface skin member may be shaped into a desired shape without creating any undue residual stress therein. To the end of simplifying the process of fabrication, the die assembly for giving a required shape to the surface skin member may be the same die assembly in which the resin core member is molded with the surface skin member placed therein.

Such a method can be conveniently carried out with a die assembly for fabricating an automotive interior component consisting of a resin core member having a desired shape and a surface skin member laminated on an outer surface of the resin core member, comprising: a lower die having a required die surface; an extruder associated with the lower die so as to supply resin material for molding the resin core member onto the die surface of the lower die; an upper die having a die surface defining a cavity required for molding the resin core member in cooperation with the die surface of the lower die; power means for moving the upper die toward and away from the lower die; and an annular clamping device provided on the upper die for securing a peripheral part of the surface skin member which is held between the die surfaces of the upper and lower dies.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
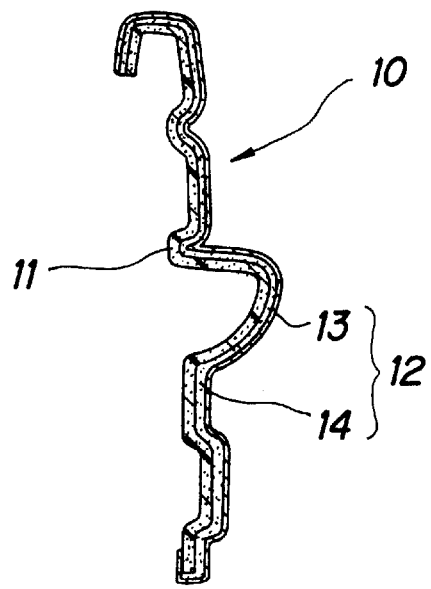
FIG. 1 is a sectional view of an automotive door trim member fabricated according to the method of the present invention.
Figure 2:
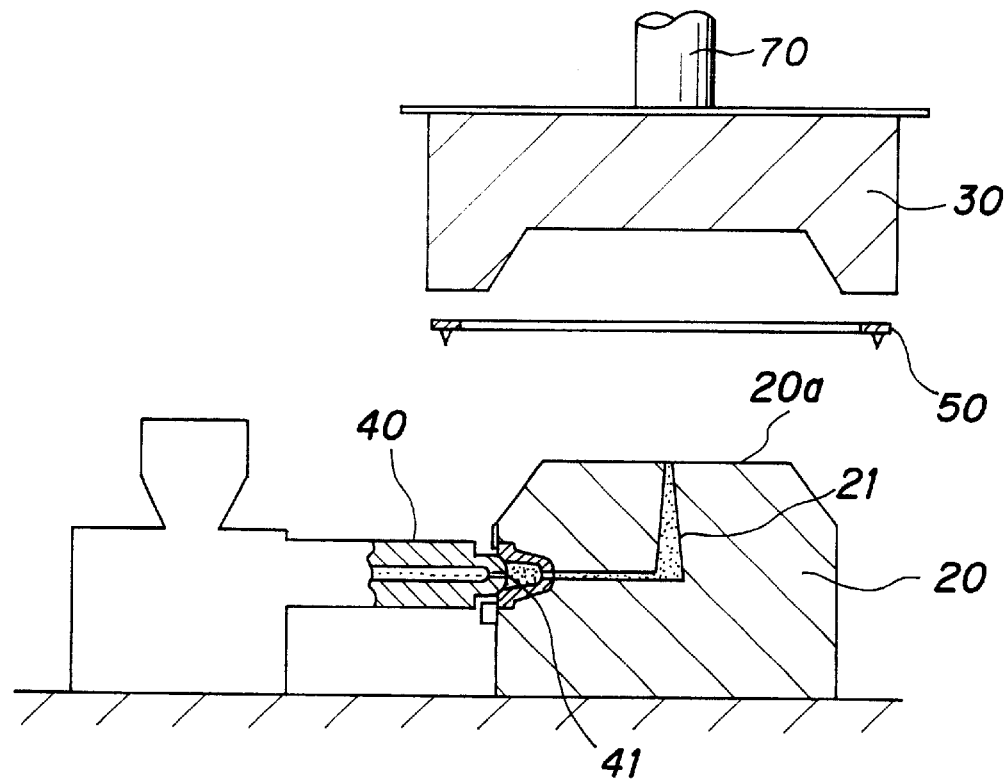
FIG. 2 is a sectional view showing the die assembly for shaping the surface skin member into an approximately final shape.

FIG. 1 shows an automotive door trim fabricated according to the present invention, and FIG. 2 illustrates the die assembly for carrying out the method of the present invention. FIGS. 3 through 7 show different steps of the method of the present invention.

Referring to FIG. 1, the door trim 10 fabricated by the method of the present invention essentially consists of a resin core member 11 molded into a desired shape, and a surface skin member 12 laminated on the outer surface of the resin core member 11.

More specifically, the resin core member 11 is made by supplying resin material such as PP resin and ABS resin containing filler materials in semi-molten state into a die assembly for mold press forming defining a required cavity therein, and molding the resin material into a complicated curved shape by a mold pressing forming process.

The surface skin member 12 may consist of any material which suits the particular application, and such materials include a simple PVC sheet, a PVC sheet lined with a layer of foamed polyolefin resin such as foamed polyethylene, and a PVC sheet lined with a layer of foamed polyurethane. In the present embodiment, the surface skin member 12 consists of a PVC sheet 13 lined with a layer of foamed polyethylene 14.

Referring to FIG. 2, this mold press forming die assembly consists of a lower die 20 having a desired die surface contour, and an upper die 30 having a substantially complementary die surface contour which is moveable vertically toward and away from the lower die 20 by a power unit 70 (although only a part thereof is illustrated in the drawings) so as to define a required cavity in cooperation with the lower die 20 and be clamped thereto. In conjunction with the lower die 20 of this mold press forming device, there is provided an extruder 40 which supplies resin material in semi-molten state into the cavity of the die assembly by way of gates 21 defined in the lower die 20 although only one of them is illustrated in the drawings. Additionally, an annular clamping device 50 is provided around the upper and lower dies 20 and 30 to secure the periphery of the surface skin member 12 so as to hold the surface skin member 12 between the die surfaces of the upper and lower dies 20 and 30.

Referring to FIGS. 3 through 7, the process of fabricating the automotive door trim 10 is described as follows.

Figure 3:
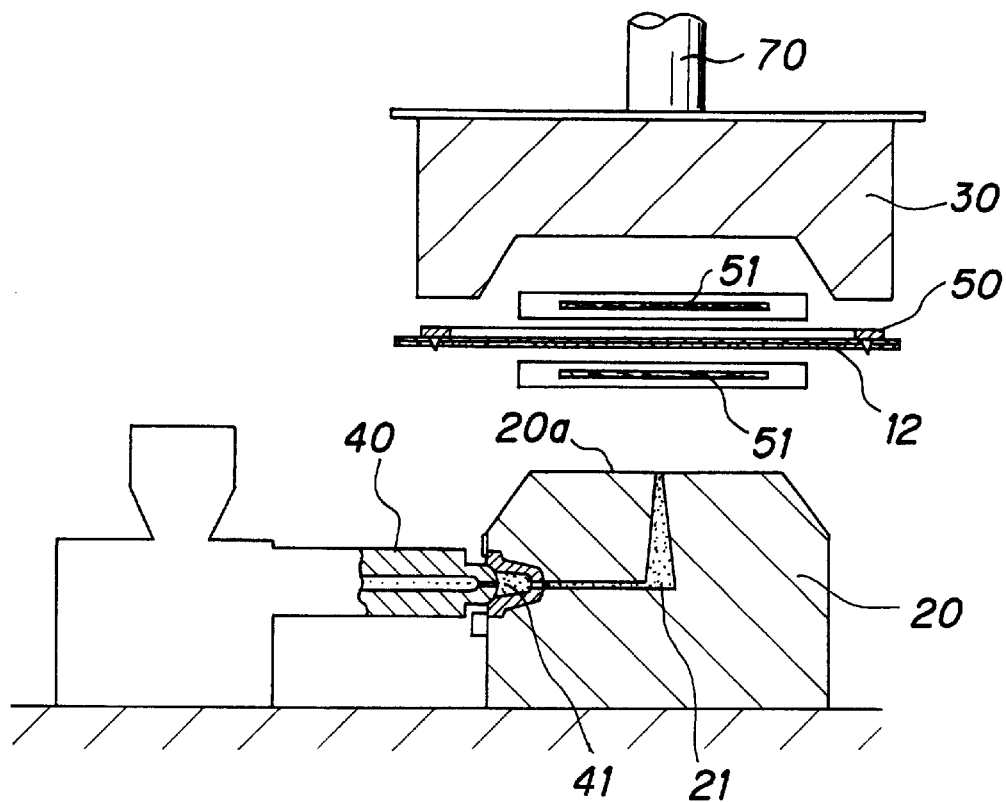
FIGS. 3 through 7 are views similar to FIG. 3 showing the different steps of the method of the present invention.

First of all, as shown in FIG. 3, the upper and lower dies 20 and 30 of the mold press forming die assembly are opened up, and the surface skin member 12 is held between the upper and lower dies 20 and 30 by securing the periphery of the surface skin member 12 with the clamping device 50. The surface skin member 12 is at the same time heated by a heater 51. The temperature condition of the surface skin member 12 in this step depends on the material of the surface skin member. The surface temperature of the surface skin member should range between 100° C. and 120° C. when it consists of a PVC sheet lined with a layer of foamed polyetheylene, and between 80° C. and 100° C. when it consists of a simple PVC sheet or a foamed PVC sheet.

Figure 4:
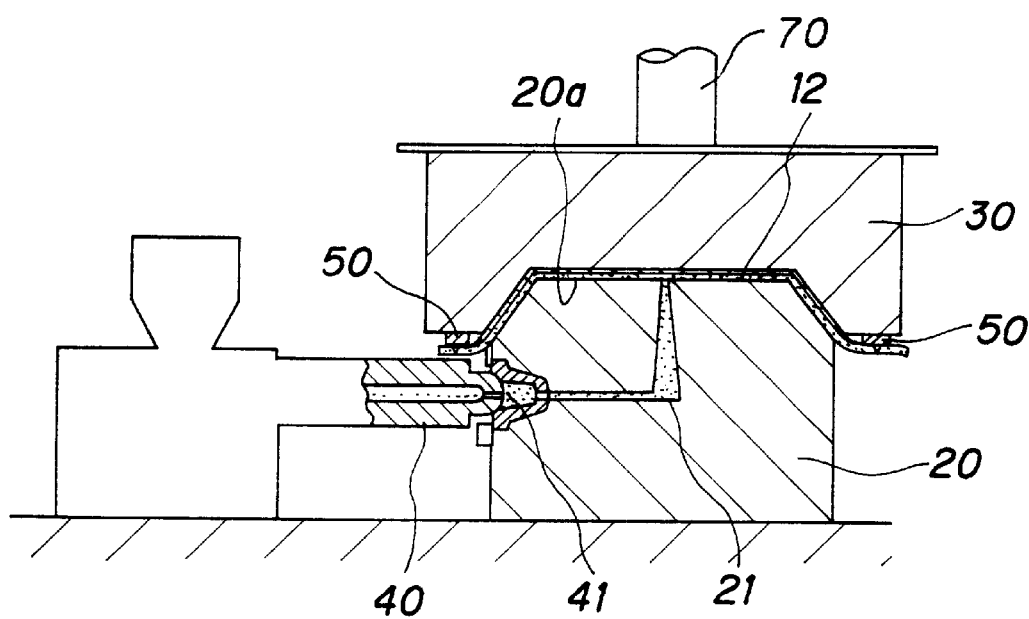

Thereafter, the heater 51 is withdrawn, and the upper die 30 is lowered as illustrated in FIG. 4 so as to give a prescribed form to the surface skin member 12 with the upper and lower dies 20 and 30. This concludes the preliminary molding process for the surface skin member 12.

Figure 5:
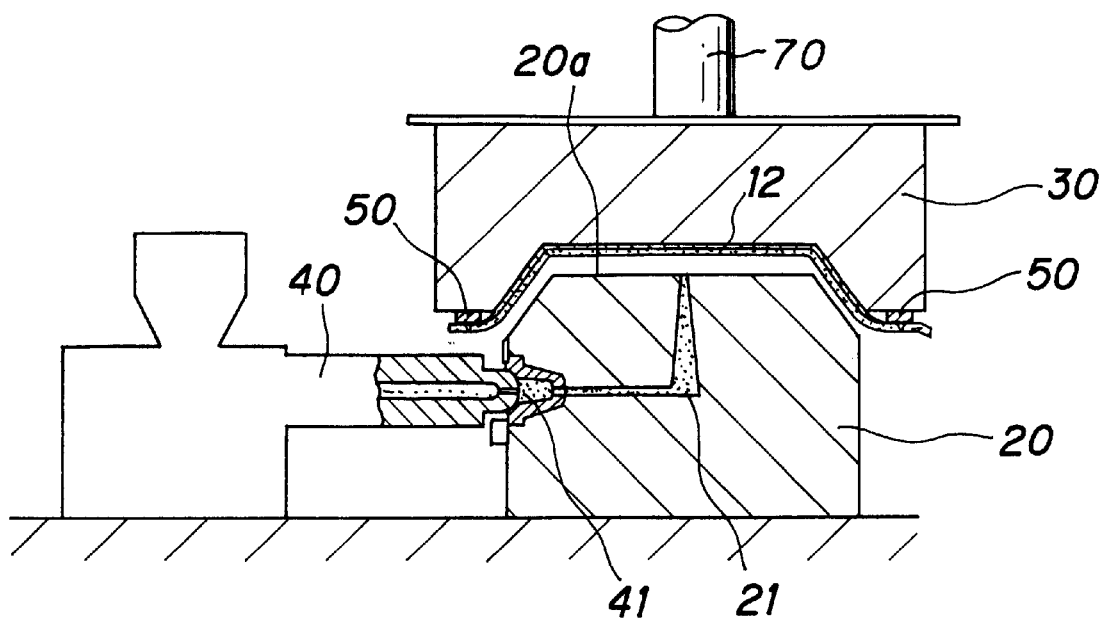

Referring to FIG. 5, the upper die 30 is lifted by a prescribed distance. To prevent the positional shifting of the surface skin member 12, the clamping device 50 is attached to the upper die 30, and the preliminarily molded surface skin member 12 is kept retained to the die surface of the upper die 30. Therefore, a certain clearance is defined between the die surface 20a of the lower die 20 and the surface skin member 12.

Figure 6:
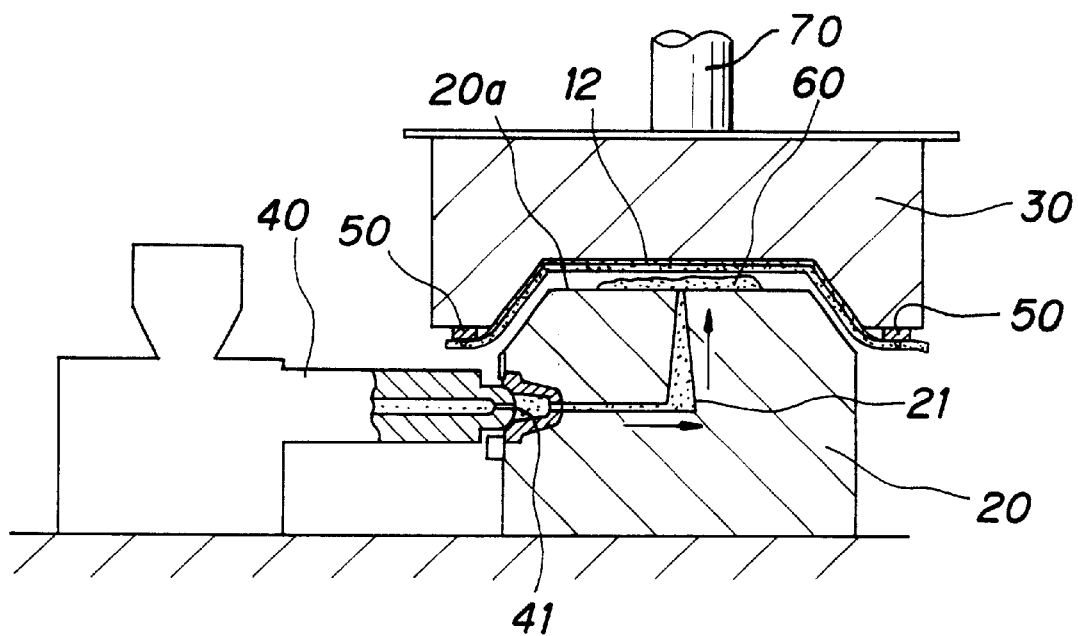

Then, the resin material in semi-molten state is fed into the gates 21 via a nozzle 41 of the extruder 40, and a prescribed amount of the resin material 60 is supplied to the die surface of the lower die 20 as shown in FIG. 6. As an alternative mode of supplying the resin material 60 onto the die surface 20a of the lower die 20, the nozzle of the extruder may be placed directly between the upper and lower dies 20 and 30.

Figure 7:
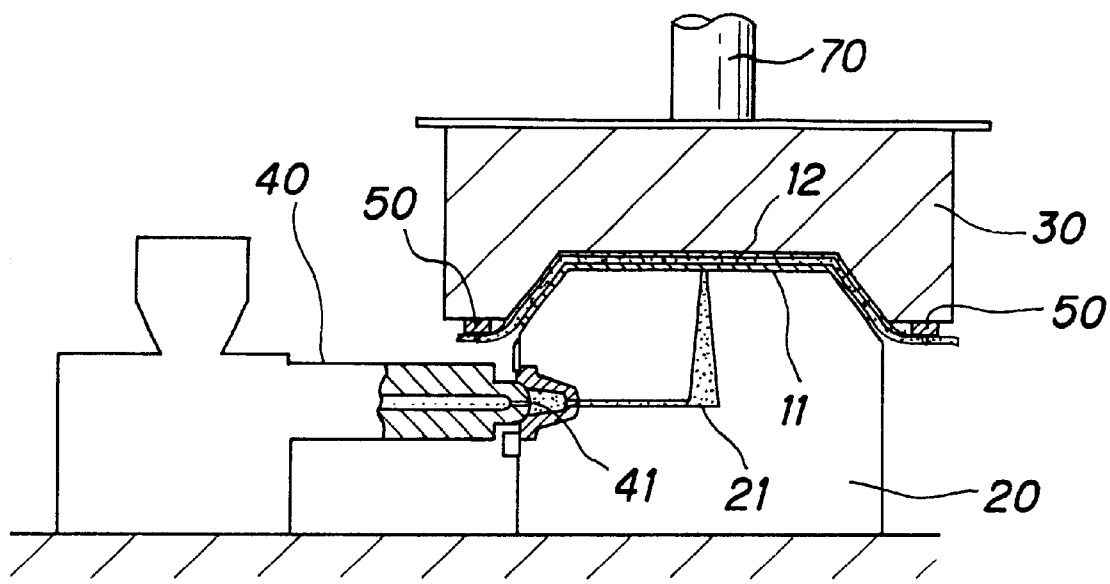
Figure 8:
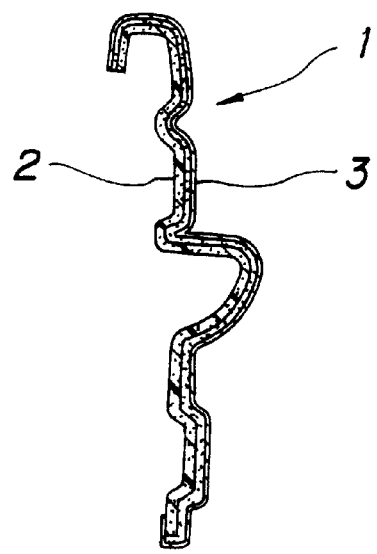
FIG. 8 is a sectional view of an automotive door trim member fabricated according to the conventional method.
Figure 9:
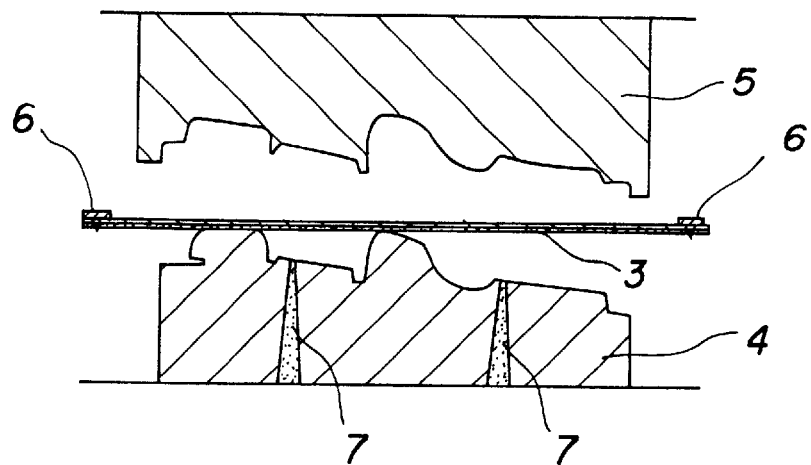
FIGS. 9 and 10 are sectional views of a die assembly for fabricating the automotive interior component illustrate in FIG. 8 showing the different steps of the conventional method.
Figure 10:
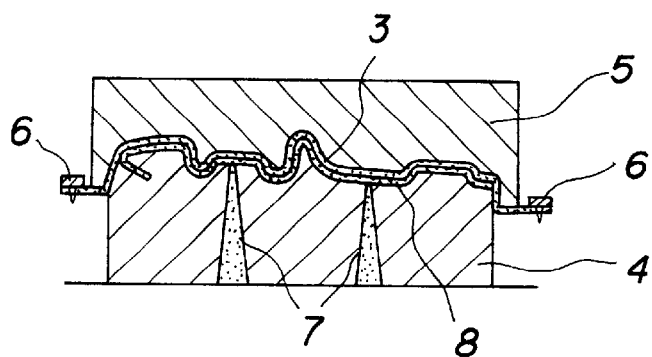
Figure 11:
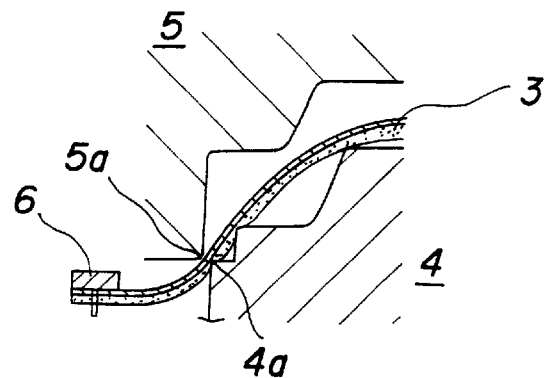
FIG. 11 is a sectional view showing a problem with the conventional method for fabricating an automotive interior component.

Referring to FIG. 7, the upper die 30 is lowered, and the resin material is formed into a desired shape by engagement of the upper and lower dies 20 and 30 so that the surface skin member 12 is integrally attached to the outer surface of the resin core member 11 at the same time as the resin core member 11 is molded. Since the surface skin member 12 is already molded into an appropriately curved shape by the preliminary molding process, a clearance of a constant thickness is defined between the reverse surface of the surface skin member 12 and the die surface 20a of the lower die 20, and the fluidity of the resin material in semi-molten state is improved. Therefore, the thickness of the resin core member 11 can be reduced, and one can reduce not only the weight but also the cost through substantial saving in the material cost.

Since the surface skin member 12 is subjected to the preliminary molding process, no excessive tension would be applied to the parts of the surface skin member 12 which are more stretched than other parts, and the breakage and the wrinkling of the surface skin member 12 can be prevented. Further, since the surface skin member 12 produces very little resistance to the flow of the resin material in semi-molten state, the flow property of the resin material is improved, and the choice of the resin material can be broadened. It also allows the number of gates to be reduced, and the fabrication of the die assembly can be simplified and economized.

The preferred embodiment of the present invention is described in the following by giving specific examples of the conditions for molding.

A PVC sheet 13 of 0.6 mm thickness laminated with a layer of polyethylene foam of 3 mm thickness in the back is used as the surface skin member 12, and after being heated to the temperature of 100 to 120° C. is press molded between the upper and lower dies 20 and 30. The press pressure was 10 kg/cm$^2$, and the duration of the pressure was 30 seconds.

Thereafter, the upper die 30 is lifted, and a composite PP resin material consisting of a mixture of 80 parts of PP resin and 20 parts of filler in semi-molten state is supplied to three locations on the die surface of the lower die 20. Then, the upper and lower dies 20 and 30 are engaged, and the composite PP resin material is formed into the resin core member 11 having a desired shape and, at the same time, the surface skin member 12 consisting of the PVC sheet 13 backed by the polyethylene foam layer 14 is integrally attached to the surface of the resin core member 11. The press pressure was 80 kg/cm$^2$, and the duration of the pressure was 40 seconds.

The final product free from breakage or wrinkles can be obtained by removing it from the die assembly after lifting the upper die and opening up the die assembly.

The advantages of the present invention may be summarized as given in the following:

(1) Since the surface skin member is molded into an approximately final shape before combining it with the resin core member, even the most stretched part of the surface is not subjected to any excessive tension during the process of mold press forming the resin material in semi-molten state, and the surface is therefore free from any unacceptable breakage and wrinkling. This improves not only the external appearance of the final product but also improves the economy of the material.

(2) Since the surface skin member is molded into an approximately final shape during the preliminary molding step, the resistance of the surface skin member to the flow of the semi-molten resin material is reduced so that the thickness of the resin core member can be reduced, and the economy of the material can be improved. Thus, the present invention contributes to both cost reduction and weight reduction of the final product.

(3) Since the surface skin member is molded into an approximately final shape during the preliminary molding step, and, therefore, resin material having relatively low fluidity can be safely used, not only the choice of the resin material is broadened but also the number of gates in the die assembly can be reduced. This latter feature allows the cost of the die assembly to be reduced.

Although the present invention has been described in terms of a specific embodiment, it is possible to modify and alter details thereof without departing from the spirit of the present invention.

What we claim is:

1. A method for fabricating an automotive interior component comprising a resin core member having a desired shape, and a surface skin member attached to an external surface of said resin core member, comprising the steps of:
    preliminarily giving a desired shape to said surface skin member by engaging a die assembly for mold press forming while a peripheral part of said surface skin member is secured by a clamping device to form a preformed surface skin member;
    subsequently, lifting said upper die, while said preformed surface skin member is secured by the clamping device and is kept retained to said upper die thereby defining a cavity between said upper die and said lower die;
    supplying resin material in semi-molten state onto a die surface of said lower die within said cavity; and
    engaging said upper and lower dies by lowering said upper die so as to mold said resin material into said resin core member, having a desired shape and integrally attach said preformed surface skin member to said molded resin core member.

2. A method according to claim 1, wherein said surface skin member is softened by heat in said step of giving a required shape to said surface skin member.

3. A method according to claim 2, wherein said clamping device is provided around said upper die, said clamping device securing said surface skin member at least until said upper and lower dies are engaged.

4. A method according to claim 2, wherein said surface skin member comprises a PVC sheet and a layer of polyethylene foam laminated on a reverse surface of said PVC sheet, and said surface skin member is heated to a temperature of 100 to 120° C. in said step of giving a required shape to said surface skin member.

5. A method according to claim 1, wherein said automotive interior component consists of a component forming a part of the upholstery of a passenger compartment of a motor vehicle.

6. A method according to claim 1, wherein said automotive interior component consists of an automotive door trim.

* * * * *